Jan. 13, 1970   W. B. HUNTER ET AL   3,489,428
STABILIZING SUPPORT FOR A CAMPING TRAILER AND THE LIKE
Filed June 1, 1967   2 Sheets-Sheet 1
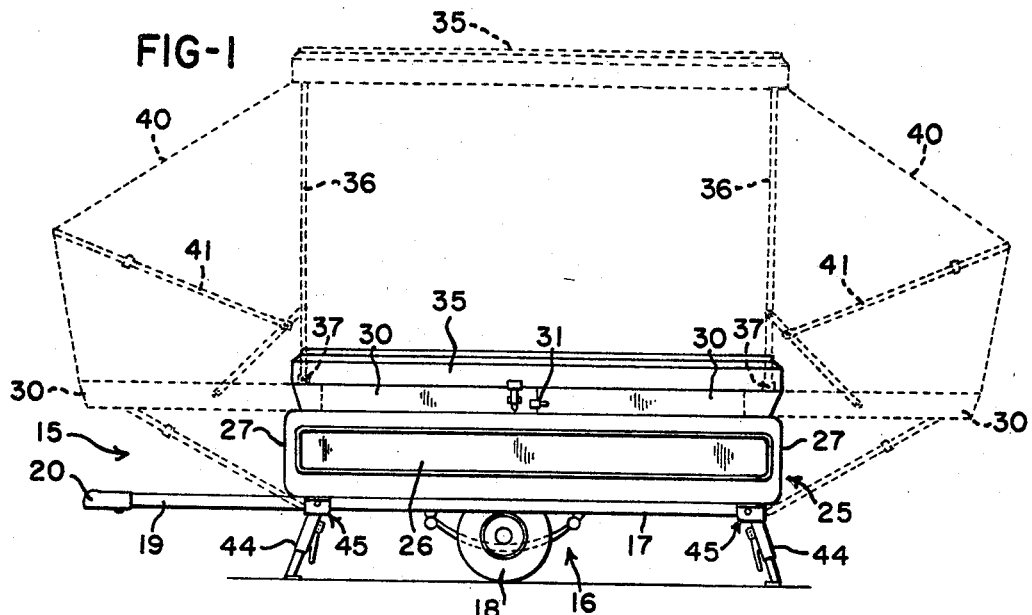
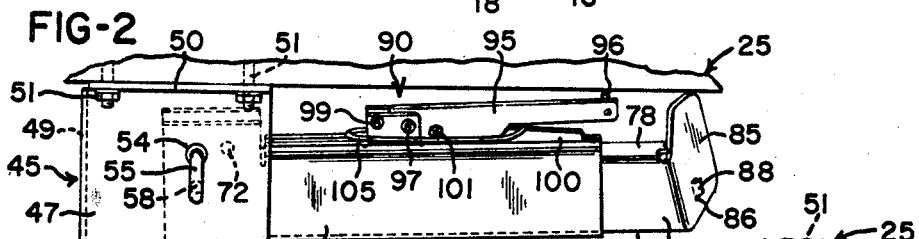
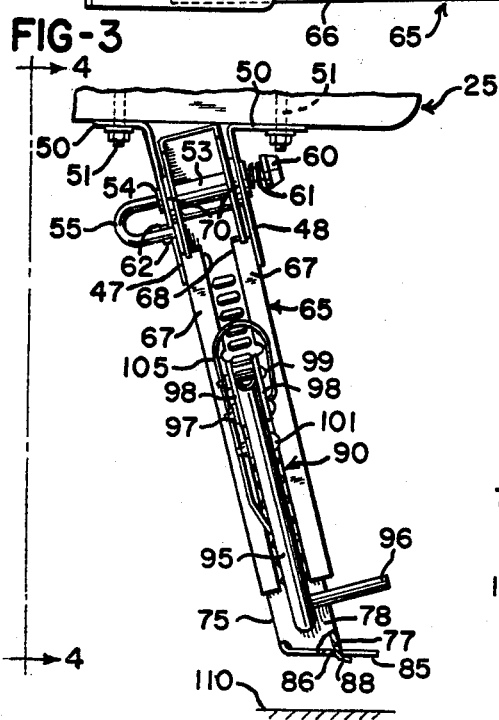
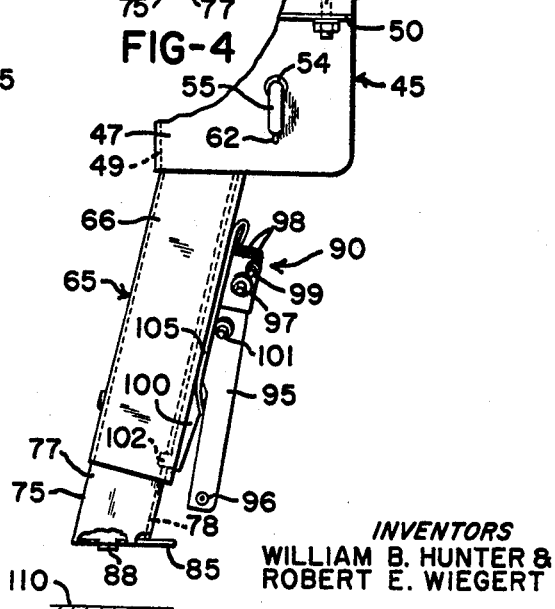
INVENTORS
WILLIAM B. HUNTER &
ROBERT E. WIEGERT
BY
Marechal, Biebel, French & Bugg
ATTORNEYS

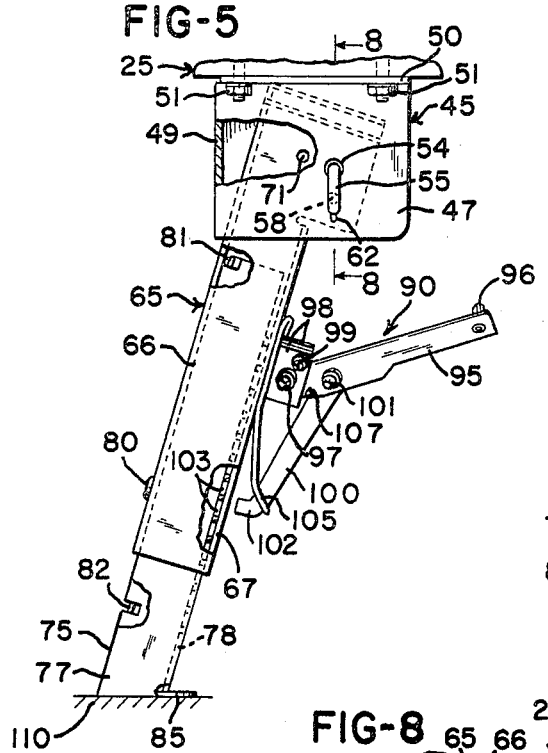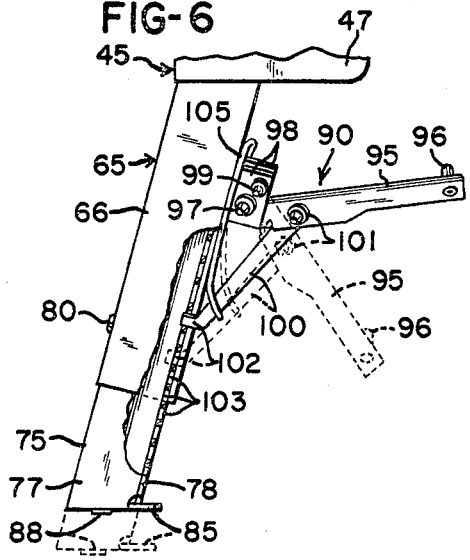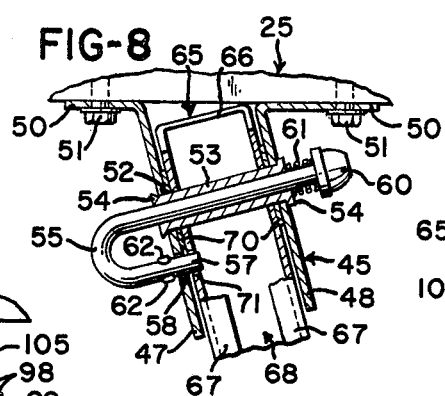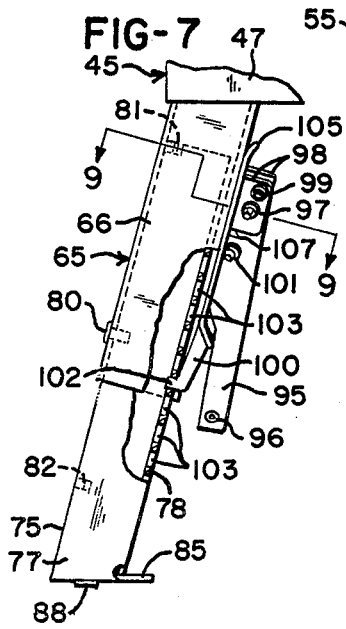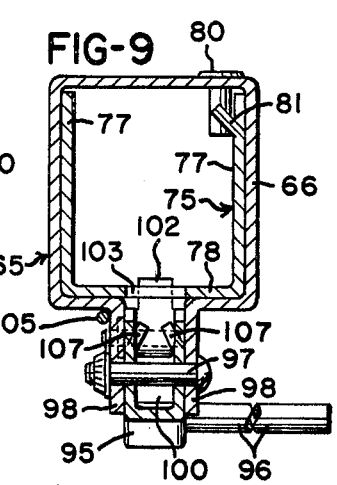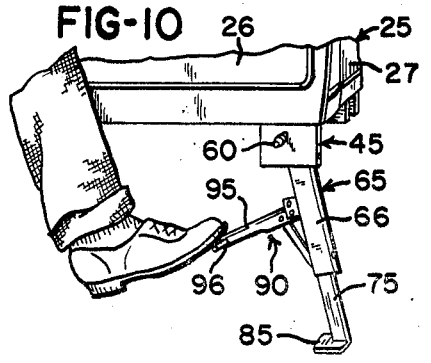

United States Patent Office 3,489,428
Patented Jan. 13, 1970

3,489,428
STABILIZING SUPPORT FOR A CAMPING TRAILER AND THE LIKE
William B. Hunter, Hamilton, and Robert E. Wiegert, Middletown, Ohio, assignors to Ward Manufacturing, Inc., Hamilton, Ohio, a corporation of Ohio
Filed June 1, 1967, Ser. No. 642,881
Int. Cl. B60s 9/02, 9/00
U.S. Cl. 280—150.5                                    7 Claims

ABSTRACT OF THE DISCLOSURE

A stabilizing support for the corner of a trailer body including an extendable leg pivotable between a retracted position adjacent the body and a depending locked position wherein the leg is extended to engage the ground, and also including a lever-actuated jack forming the lower end of the leg and extendable thereon into engagement with the ground to elevate the trailer and transport a portion of its weight to the support.

Background of the invention

After a two-wheeled camping or travel trailer is parked at a camp site, it is common to place a rigid support under each corner of the trailer to stabilize the trailer and to prevent it from tipping and rocking during use. Such supports are especially desirable on a two-wheeled collapsible camping trailer wherein the body supports extendable beds and a collapsible cover, since such a trailer is frequently disconnected from the towing vehicle at the camp site.

One common type of support is a rigid elongated leg which is supported within a socket rigidly mounted on the trailer body and is slidable between a retracted position within the body and a downwardly extending position where the lower end of the leg engages the ground. A series of longitudinally spaced holes are usually formed within the leg for selectively receiving a cross pin extending through aligned holes formed within the socket. With this type of support, however, it is necessary to lift the corner of the trailer by hand after the leg is dropped and before inserting the pin to transfer a portion of the trailer weight from the wheels to the leg.

Another type of stabilizing support which has been used is a screw jack which is pivotally connected to a lower corner of the trailer and swings from a retracted position adjacent the trailer body to a downwardly extending position. It has been found, however, that the screw jacks are not only awkward and time consuming to actuate but frequently become corroded from water sprayed from the wheels and as a result become difficult to actuate.

Summary of the invention

The present invention is directed to the provision of an improved stabilizing support for a camping trailer or similar vehicle which offers substantial advantages over prior practice, especially from the standpoint of strength, stability, and ease of operation. In accomplishing this purpose, the invention provides such a support incorporating a jacking mechanism which has a substantial range of adjustability and which operates with relatively little effort to effect a positive lifting action on the adjacent corner of the trailer over a limited range sufficient to stabilize the support while retaining it in effective supporting position.

More specifically, the invention provides a support comprising a composite leg mounted for pivotal movement between a retracted position for travel purposes and a depending position for supporting purposes. The composite leg in turn incorporates a jack mechanism for forcing its two relative telescoping leg portions apart to effect the desired stabilizing action. This jack mechanism in turn includes a pivoted lever having a substantial mechanical advantage for convenient operation by the hand or foot of the user and which is mounted for overcenter movement to a releasably locked position wherein the two leg portions are positively held in the desired stabilizing relation. Special advantages of the construction of the invention derive both from its strength and stability and also from its ease of operation with minimum necessity for manual contact with the operating parts.

The manner in which the invention accomplishes the foregoing objectives, and additional objects and advantages of the invention will be pointed out in the course of the description hereinafter of the preferred embodiment and the claims.

Brief description of the drawings

FIG. 1 is a side view of a collapsible camping trailer provided with stabilizing supports constructed in accordance with the invention and illustrating the retracted and extended positions of the beds and cover;

FIG. 2 is a fragmentary view of a corner of the trailer and a stabilizing support with its leg shown in the retracted position;

FIG. 3 is a view looking forward at the right front stabilizing support with the leg lowered to its supporting position;

FIG. 4 is a view looking generally along the line 4—4 of FIG. 3;

FIG. 5 is a view similar to FIG. 4 with portions of the support broken away and showing the jack mechanism moved to a position for releasing the leg;

FIG. 6 is a fragmentary view similar to FIG. 5 showing the jack mechanism moved to a position engaging the leg;

FIG. 7 is a fragmentary view similar to FIG. 6 showing the jack mechanism moved to a locked position;

FIG. 8 is a fragmentary section on the line 8—8 of FIG. 5;

FIG. 9 is a fragmentary section on the line 9—9 of FIG. 7; and

FIG. 10 is a perspective view of the stabilizing support shown in FIGS. 1–7 and illustrating its operation.

Brief description of the preferred embodiment

Referring to FIG. 1, the camping trailer 15 includes a chassis 16 comprising a frame 17 supported by a pair of wheels 18 and having a tow bar 19 with a hitch 20 adapted to be connected to a ball mounted on a towing vehicle. The chassis supports a generally rectangular body 25 having parallel spaced side panels 26 and end panels 27. A pair of beds 30 are slidably mounted on the body 25 and are movable horizontally between a retracted position wherein they are connected by toggle clamps 31 and an extended position illustrated by the dotted lines in FIG. 1.

A substantially rigid top 35 having a rectangular configuration conforming to the body, extends over the beds 30 in their retracted positions and is connected to the beds by a pair of inverted U-shaped bows 36 which are pivotally mounted on opposite ends of the top and have end portions pivotally connected at 37 to the inner corners of the corresponding beds. Thus when the beds 30 are extended, the top 35 is simultaneously moved to an elevated position as shown by the dotted lines in FIG. 1.

A flexible canopy 40 of canvas or the like is connected to the periphery of the top 35 and extends downwardly for attachment to the side panels 26 of the body and the outer edges of both beds 30. A collapsible bow 41 supports the canvas over each bed 30 to provide a tent portion which cooperates with the elevated top 35 to provide a protected living and sleeping area.

A set of four stabilizing supports 44 constructed in accordance with the invention are mounted on the underneath surface of the body 25 adjacent its corners. Since the stabilizing supports are substantially identical in construction, there being mirror pairs for opposite corners, the right front or left rear support is described in detail.

Each support 44 includes a mounting bracket 45 comprising parallel spaced side plates 47 and 48 (FIG. 3) integrally connected by an end plate 49 (FIG. 5) to define a U-shaped cross-sectional configuration. Coplanar flanges 50 extend angularly from the upper portion of the side plates 47 and 48 and are secured to the bottom surface of the body 25 by a series of four bolts 51. As illustrated in FIG. 3, the side plates 47 and 48 form acute angles with a plane extending normal to the bottom surface of the body 25.

A pair of aligned holes 52 (FIG. 8) are formed within the side plates 47 and 48 and receive a tube 53 which has expanded end flanges 54 securing it rigidly to the side plates. A lock pin 55 extends through the tube 53 and has a U-shaped end portion so that its end 57 can project through a hole 58 in bracket side plate 47. A button 60 is secured to the opposite end of pin 55 and is biased outwardly from the side plate 48 by a compression spring 61 surrounding pin 55 between the end of the tube 53 and the button 60. The spring 61 serves to bias the pin end 57 into the hole 58 to the limited extent permitted by integral ears 62 on pin 55.

Each bracket 45 supports a composite leg 65 comprising an upper leg portion 66 of generally rectangular section including longitudinally extending coplanar flanges 67 (FIG. 3) which define therebetween an elongated slot 68. The upper end of the leg portion 66 interfits between the side plates 47 and 48 of the bracket 45 and is pivoted therein on the tube 53. As shown in FIG. 8, thin low friction plastic washers 70 are spaced between the leg portion 66 and the bracket plates 47 and 48. The wall of leg portion 66 adjacent the side plate 47 is also provided with a pair of holes 71–72 (FIGS. 2 and 5) which selectively receive the tip portion 57 of the pin 55 for alternately locking the leg 65 in a retracted position (FIG. 2) extending adjacent the underneath surface of the body 25 and the downwardly extending position shown in FIG. 3.

The leg 65 includes a lower leg portion 75 comprising an elongated channel which telescopes within the leg portion 66 and includes parallel spaced flanges 77 (FIG. 9) and a central web portion 78. Sliding movement of the leg portion 75 within leg portion 66 is limited by a stop member 80, shown as a stud, projecting internally of the leg portion 66 in position for alternate engagement by tabs 81 and 82 bent inwardly from the adjacent flange 77. A foot member 85 extends integrally from the lower end of one of the flanges 77 and is formed with a slot 86 for receiving a tab 88 projecting from the opposite flange 77. The tab 88 is turned against the bottom surface of the foot 85 to brace it with respect to the flange 77 opposite the flange from which the foot extends.

A jack mechanism 90 is mounted on the upper leg portion 66 for effecting positive controlled relative downward movement of the lower leg portion 75. This jack mechanism includes an operating lever 95 having a handle 96 and pivoted by a pin 97 between a pair of tabs 98 bent outwardly from the flanges 67. A second pin 99 connecting the tabs 98 limits upward pivoted movement of lever 95. A pawl 100 is pivoted to the lever 95 by a pin 101 spaced from the pin 97 by a substantial distance, satisfactory results having been obtained with the axes of these pins approximately 13/16 inch apart. In addition, the pivot pin 101 is located in laterally offset relation with a plane running through the lever pivot pin 97 and the pawl dog 102 to provide an overcenter action for pawl 100 and its pivot pin 101 in the use of the device as described hereinafter.

The free end of the pawl 100 is formed with a dog 102 adapted for selective engagement in a series of slots 103 in the web section 78 of the lower leg portion 75. A wire spring 105 has its upper end portion formed as a hook encircling the flanges 98, and its upper end is received in a hole in one of these flanges. The lower end of the spring 105 is formed as a hook overlying the lower end of the pawl 100 to bias it toward the web 78. Tab portions 107 are formed inwardly of the inner end of the lever 95 to form stops limiting the biased movement of pawl 100.

When the trailer is being towed or is otherwise not in use for camping purposes, the composite leg 65 of each support 44 is locked in its retracted horizontally extending position shown in FIG. 2 by engagement of pin 55 in hole 71. Additionally, each lower leg portion 75 will similarly be held in retracted position within upper leg portion 66 by engagement of pawl dog 102 in one of the lowermost slots 103. After the trailer is parked at the camp site, the button 60 for each support 44 is depressed, manually or by the foot of the operator, so that the tip 57 of each lock pin 55 is retracted from the corresponding hole 71. Each composite leg 65 is then free to swing downwardly until its pin tip 57 engages the other hole 72 to lock the leg 65 in the downwardly extending position shown in FIGS. 3 and 4 wherein it forms a compound angle with the bottom surface of the trailer body 25.

At this stage in the use of the invention, the lower leg portion 75 is still held in retracted position within the upper leg portion 66, and thus with its foot 85 above the ground surface indicated at 110 in FIG. 4. The operator then lifts the jack lever 95, by hand or foot, to release the pawl dog 102 from the slot 103 in which it is then engaged, thereby permitting the lower leg portion 75 to slide downwardly until its foot 85 engages the ground, the relative positions of the parts at this point being shown in FIG. 5. The operator then releases the jack handle 95, whereupon the spring 105 biases the pawl 100 back toward the web 78 until the dog 102 engages a hole 103 or the web portion between two of these holes. The operator now depresses the jack handle 95, and if the dog 102 has not already engaged in a hole 103, it will slide along the web 78 until it does so. This position of the parts is shown in full lines in FIG. 6.

The final stage of erection of the device of the invention comprises completion of the downward movement of the jack handle 95 to the position of essential parallelism with the leg 65 which is shown in FIG. 7, and this movement is conveniently effected by the foot of the operator as shown in FIG. 10. During this motion of jack lever 95, it forces the pawl 100 downwardly to the full extent provided by the spacing of the axes of pivots 97 and 101, thereby driving the lower leg portion 75 positively downward with respect to the trailer and correspondingly elevating the trailer corner and transfers a portion of its weight to the leg portion 75.

The elevating action of the jack mechanism as just described is effective to only the limited extent of the spacing of the pivot pins 97 and 101, and with the parts proportioned as described, it is of the order of 1 inch. This amount of movement has been found satisfactory to stabilize each of four supports 44 while maintaining them all in firm engagement with the ground and correspondingly stabilizing the trailer as a whole. It will also be noted that with the pivot pins 97 and 101 spaced for overcenter action as described, the limit position of lever 95 shown in FIG. 7 is effectively over center such that lever 95 is locked in that position until it is positively withdrawn therefrom.

When the trailer is to be collapsed for travel purposes, each support 44 is operated in the reverse of the sequence just described. Initially, each lever 95 is raised to the release position shown in FIG. 5 wherein the pawl dog 102 is disengaged from all of the slots 103. The lower leg portion 75 is then manually telescoped to a retracted position within the upper leg portion 66, after which the handle 95 is released and then returned to its locked position to hold the leg portion 75 retracted in place by engagement of dog 102 in a hole 103. The lock pin 55 is then released from the hole 72, by momentary depressing of the button 60, after which the composite leg is swung into its retracted position shown in FIG. 2 into which it is locked by engagement of pin tip 57 in hole 71.

The support construction of the invention provides a plurality of significant advantages, especially from the standpoint of strength and convenience. For example, since it is adjustable over a substantial range, satisfactory results having been obtained with the holes 103 spaced over a range of 6 to 7 inches, It is not necessary that the trailer be parked on level ground because the individual supports can be adjusted to compensate for an irregular surface. The positive lifting and locking action adds strength and rigidity, and it is a major item of convenience that most of the operating movements can be carried out by hand or foot of the user out of contact with the ground, which is especially advantageous if the ground should be muddy or otherwise soft. Additionally, the relatively large foot 85 minimizes the need for supplemental supports.

It should be understood that while the stabilizing support of the invention has been described in conjunction with a two-wheeled camping trailer, it is not limited to such use and is equally adaptable for use with other vehicles having similar chassis, such for example as utility trailers, gun mounts and the like. It is also to be understood that while the construction herein described constitutes a preferred embodiment of the invention, the invention is not limited to this precise construction, and changes may be made therein without departing from the scope of the invention which is defined in the appended claims.

What is claimed is:

1. A stabilizing support for a wheeled vehicle, comprising a bracket adapted for mounting on a lower corner of the vehicle, an extendable composite leg including relatively slidable telescoping upper and lower portions, pivot means connecting said upper leg portion to said bracket for movement of said composite leg between a retracted position adjacent the vehicle and a downwardly extending supporting position, means for selectively retaining said composite leg in said retracted and supporting positions, a jack mechanism including an elongated lever, one of said leg portions including means pivotally supporting said lever for movement between an outwardly projecting position and a locked position extending substantially parallel to said leg, means defining a series of longitudinally spaced opening in the other said leg portion, and a pawl having a pivotal mounting on said lever for movement to a position generally parallel to said lever in said locked position and engageable selectively in said openings to force said leg portions apart in response to movement of said lever from said outwardly projecting position to said locked position for transferring a portion of the weight of the vehicle to said support.

2. A support as defined in claim 1 wherein said means pivotally supporting said lever and said pivotal mounting for said pawl are arranged to provide overcenter movement of said pawl mounting with respect to said means pivotally supporting said lever for retaining said lever in said locked position.

3. A support as defined in claim 1 comprising spring means biasing said pawl to a position of engagement with said other leg portion for holding said lever in said collapsed position.

4. A support as defined in claim 1 wherein said lever is pivotally mounted on said upper leg portion, said longitudinally spaced openings are in said lower leg portion, and each said leg portion being formed of sheet metal and having a rectangular cross-sectional configuration.

5. A support as defined in claim 1 wherein said leg comprises a sheet metal leg having a rectangular cross-sectional configuration, and a foot comprising a substantially flat sheet metal flange integrally connected to said leg.

6. A stabilizing support for a wheeled vehicle, comprising a bracket adapted to be mounted on a lower corner of the vehicle, an extendable composite leg including relatively slidable telescoping upper and lower portions, each said leg portion being formed of sheet metal and having a channel-like cross-sectional configuration defined by parallel spaced side walls integrally connected by an end wall, said leg portions arranged with said end walls in opposed relation, means defining longitudinally spaced openings within said end wall of said lower leg portion, said upper portion further including inwardly projecting integral flanges for confining said lower leg portion and defining a longitudinally extending slot exposing said openings, pivot means connecting said upper leg portion to said bracket for movement of said composite leg between a retracted position adjacent the vehicle and downwardly extending supporting position, means for selectively retaining said composite leg in said retracted and supporting positions, means forming a foot on said lower leg portion, and a lever actuated jack interconnecting said leg portions and operable to engage said openings to extend said leg portions after said foot engages the ground to elevate the corner of the vehicle.

7. A support as defined in claim 6 wherein said foot comprises a substantially flat sheet metal flange integrally connected to said lower leg portion.

References Cited

UNITED STATES PATENTS

| | | | |
|---|---|---|---|
| 2,153,722 | 4/1939 | Loughmiller | 280—150.5 |
| 2,296,789 | 9/1942 | Johnson | 280—150.5 |
| 2,571,390 | 10/1951 | Strand | 280—475 |
| 2,865,658 | 12/1958 | Dubuque | 280—475 |
| 3,314,692 | 4/1967 | Karns | 280—475 |
| 1,107,792 | 1/1916 | Byron | 280—150.5 |
| 2,135,080 | 11/1938 | Johnston | 254—108 |

LEO FRIAGLIA, Primary Examiner

ROBERT R. SONG, Assistant Examiner

U.S. Cl. X.R.

254—86; 296—23